United States Patent [19]

Klein et al.

[11] Patent Number: 5,509,667
[45] Date of Patent: Apr. 23, 1996

[54] RADIAL LIP SEAL FOR A SHAFT IN A HOUSING

[75] Inventors: Norbert Klein; Gerhard Freiwald, both of Hemsbach, Germany

[73] Assignee: Firma Carl Freudenberg, Weinheim, Germany

[21] Appl. No.: 147,200

[22] Filed: Nov. 3, 1993

Related U.S. Application Data

[63] Continuation-in-part of Ser. No. 32,897, Mar. 18, 1993, Pat. No. 5,370,404.

[30]     Foreign Application Priority Data

Nov. 4, 1992 [DE] Germany .................. 42 37 190.2

[51] Int. Cl.⁶ .................................................. F16J 15/32
[52] U.S. Cl. .................. 277/37; 277/152; 277/153; 384/486
[58] Field of Search .................. 277/35, 36, 37, 277/38, 39, 152, 153, 183; 384/484, 486

[56]         References Cited

U.S. PATENT DOCUMENTS

| | | | |
|---|---|---|---|
| 2,823,966 | 2/1958 | Reynolds | 384/484 |
| 3,306,683 | 2/1967 | Deuring | 277/37 |
| 3,627,391 | 12/1971 | Bingle | 384/486 X |
| 3,856,368 | 12/1974 | Andersen | 384/486 X |
| 4,566,812 | 1/1986 | Takei et al. | 384/484 |
| 4,611,931 | 9/1986 | Brandenstein et al. | 384/486 X |
| 4,749,287 | 6/1988 | Anguera | 384/484 |
| 4,780,004 | 10/1988 | Anguera | 384/484 |
| 4,848,776 | 7/1989 | Winckler | 384/486 X |
| 4,872,770 | 10/1989 | Dickinson | 277/152 |
| 4,974,973 | 12/1990 | Janeke | 384/484 |
| 5,022,770 | 6/1991 | Guasch | 384/486 X |
| 5,167,419 | 12/1992 | Robertson | 277/153 |
| 5,370,404 | 12/1994 | Klein et al. | 277/37 |

FOREIGN PATENT DOCUMENTS

| | | | |
|---|---|---|---|
| 0562160 | 9/1993 | European Pat. Off. | 277/37 |
| 2254241 | 8/1975 | France | 277/35 |
| 3304397 | 8/1984 | Germany . | |
| 3744442 | 7/1989 | Germany . | |
| 3835447 | 4/1990 | Germany | 384/486 |
| 4209320 | 10/1992 | Germany | 384/484 |
| 0538318 | 7/1941 | United Kingdom | 277/35 |
| 2123096 | 1/1984 | United Kingdom . | |
| 2256236 | 12/1992 | United Kingdom | 384/486 |

OTHER PUBLICATIONS

ABSTRACT of DE-GM 19 17 623, Mar. 27, 1965, Goetzewerke Friedrich Goetze Aktiengesellschaft, Burscheid, DE.

Primary Examiner—William A. Cuchlinski, Jr.
Assistant Examiner—John L. Beres
Attorney, Agent, or Firm—Kenyon & Kenyon

[57]         ABSTRACT

A seal for sealing a shaft passing through a housing wall is presented. The seal comprises a radial shaft-sealing ring with at least one sealing lip of elastomeric material under radial pretension. The sealing lip is fastened to a first leg of an essentially L-shaped first reinforcing ring. The second leg of this reinforcing ring extends axially and covers and abuts the outer ring of a roller bearing at least partially. The second leg is jacketed on the side facing the housing wall with an elastomeric material. The jacket is surrounded on the side facing the housing wall in a partial axial area by a second reinforcing ring of a resilient material. The ring abuts the housing wall at least partially during proper use under radial pretensioning. The jacket projects beyond the second reinforcing ring outside the partial axial area in the radial direction as manufactured.

13 Claims, 3 Drawing Sheets

RADIAL LIP SEAL FOR A SHAFT IN A HOUSING

This application is a continuation-in-part of application Ser. No. 08/032,897 filed on Mar. 18, 1993, entitled "Radial Lip Seal with Interposed Bearing", which issued as U.S. Pat. No. 5,370,404 on Dec. 6, 1994.

BACKGROUND OF THE INVENTION

The invention relates to a seal for sealing a shaft passing through a housing wall. The seal of this general type with which this invention is concerned surrounds a radial shaft-sealing ring with at least one sealing lip of elastomeric material under radial pretensioning. The sealing lip is attached to a first leg, pointing radially inward, of an essentially L-shaped first reinforcing ring. The second leg of this ring extends in the axial direction and at least partially overlaps and abuts the outer ring of a roller bearing. The second leg is jacketed at least on the side facing the housing wall by elastomeric material and is mountable in the housing wall under radial pretensioning.

A seal of this kind is known from DE-GM 19 17 623. The seal is designed as a tolerance ring for mounting roller bearings in receiving housings. If the receiving housing is made of light metal and the roller bearing ring is made of steel, for example, this seal compensates through the elastomer for variations in tolerance between the receiving housing and the bearing ring. Dimensioning and selection of the elastomer is a function of the tolerances to be compensated. Particularly in the case of shafts lacking optimal roundness, for example, the drive shafts of a motor vehicle transmission, problems occur when the known seal is used. Sealing of vibrating shafts or those lacking optimum roundness is therefore unsatisfactory.

The tolerance ring abuts a hole in the housing via a rubber-elastic coating with radial pretensioning. The hole has a profile that meshes with the coating for reliable axial retention of the tolerance ring.

There remains a need for an improvement on known seals such that improved sealing is obtained for a longer service life. Furthermore, there is a need for improvements in isolation the and damping of rotating shafts. Finally, there is a need for reliable prevention of axial changes in position of seals relative to their housings.

SUMMARY OF THE INVENTION

The present invention meets these needs by providing a seal for a shaft in a housing. A radial shaft-sealing ring surrounds the shaft, sealing the shaft via both sealing lips and auxiliary sealing lips. A first reinforcing ring, essentially in an L-shape, is attached to the shaft-sealing ring. A second reinforcing ring contacts the housing. A jacket formed of an elastomeric material is placed between the two reinforcing rings to allow for changes in tolerances due to heating, etc. A roller bearing is placed between an inner ring and an outer ring to allow for rotation about the shaft.

Various aspects of the invention serve to improve the characteristics of the seal to provide a long service life, effective vibration insulation and damping, and reliable spatial location of the seal within the housing. First, the jacketing is surrounded on the side facing the housing wall, in a partial axial area, by a second reinforcing ring made of a resilient material. Second, the second reinforcing ring at least partially abuts the housing wall under radial pretensioning. Third, the jacket projects beyond the second reinforcing ring outside the partial axial area in the radial direction. The elastomeric material of the jacket and its thickness depend on the details of the application. This design considerably reduces noise from acoustically disturbing vibrations which arise when the shaft is not balanced. Furthermore, propagation of undesired noise is reliably prevented. The second reinforcing ring, which may, for example, be metallic, permits stable mounting of the seal through direct contact with the housing wall via radial pretensioning. Axial displacement of the entire seal relative to the housing wall can also be avoided with this design if the shaft is deflected in the radial direction or undergoes thermal expansion.

The seal is pressed into the hole in the housing wall and reliably retained therein by friction. To provide reliable sealing, provision is made such that the jacket of the first reinforcing ring projects beyond the second reinforcing ring in the radial direction outside the partial axial area. The jacket can then be brought into engagement by elastic pretensioning with the housing wall to be sealed. In such a design, it is important that the shaft be well-guided. This is provided by supporting the roller bearings and simultaneously isolating and damping any vibrations that occur. Transmission of vibration noise to the environment is therefore minimized.

The second reinforcing ring and the jacket can be physically connected. The two components can be vulcanized to one another or joined together by an adhesive, for example. Mounting the two parts to one another in this manner is reliable and very durable. From the manufacturing engineering standpoint and to provide ease of assembly, it is advantageous for the second reinforcing ring to have an L-shaped profile and to contact a radial surface of the housing wall through at least a flange projecting in the radial direction. Manufacture is simplified especially when the second reinforcing ring is vulcanized to the jacket. Assembly and exact positioning of the seal, in the gap between the housing and the shaft, is simplified by the flange projecting radially. The seal can be inserted axially into the gap between the housing and the shaft until the flange abuts the wall of the housing.

Depending on the application, the surface area of the radially outward projecting boundary of the flange can be surrounded by an elastomer extension. This elastomer extension can be a component of the jacket and can have, on the side facing the wall, an axial sealing lip projecting in the axial direction. Leakage between the seal and the housing is prevented by this design. Sealing ribs on the jacket projecting in the radial direction and the axial sealing lip reliably seal the liquid in the relevant cavity.

The second reinforcing ring surrounds the first reinforcing ring, preferably concentrically, with a jacket provided between the two reinforcing rings. At certain thicknesses, it has been found that especially good properties such as vibration isolation and damping, as well as a minimization of noise transmission, can be achieved. A thickness of this magnitude is well suited for the majority of applications and represents a good compromise between low expansion of the seal in the radial direction and efficient vibration isolation and damping.

According to one embodiment, the second leg of the first reinforcing ring can have a gooseneck profile, whereby a partial portion of the second leg, relatively larger in diameter, partially surrounds the outer ring of the roller bearing. The partial portion of the second leg that is relatively reduced in diameter is separated from the second reinforcing ring by the radial interposition of the jacket. Here it is advantageous that the seal have especially small dimensions in the radial direction. In addition to the small dimensions in the radial direction, approximately constant wall thicknesses of the jacket and first reinforcing ring are also ensured in this embodiment, so that undesirable accumulation of material is avoided. In addition, the partial portion with an expanded diameter provides improved support for the outer ring of the roller bearing in the axial direction, ensuring exact positioning of the roller bearing within the seal.

The jacket can have at least two surrounding sealing ribs on the side facing the housing wall. These may be adjacent to one another with axial spacing. In this case the sealing ribs act as a static seal, so that depending on the pressure and viscosity of the medium to be sealed off, a number of sealing ribs can be provided sequentially in the axial direction. A good static seal is thus obtained.

The shaft can be surrounded by an auxiliary sealing lip adjacent to the sealing lip in the axial direction on the side away from the medium to be sealed off. In this way, the auxiliary sealing lip, sealing lip, and shaft delimit a volume. To improve use properties during a long service life, the volume thus formed can be filled with grease during proper use. The auxiliary sealing lip then acts as a series seal, which when combined with the grease-filled volume, keeps impurities away from the sealing lip that shorten service life. The seal of the present invention can also be used under extreme application conditions.

DETAILED DESCRIPTION OF THE DRAWINGS

Figure 1:
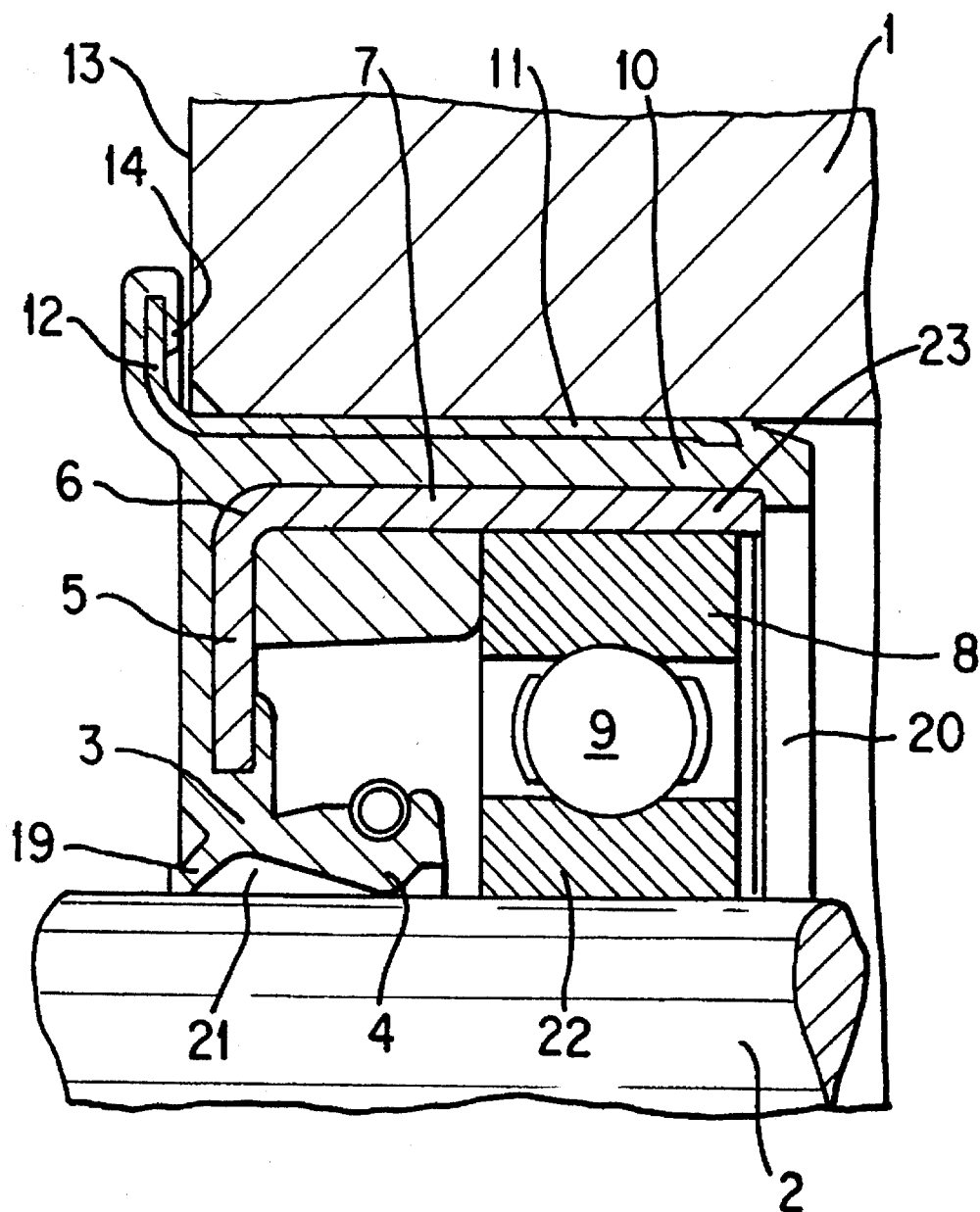
FIG. 1 shows a sectional view of an embodiment of a seal with a leg of a reinforcing ring extending in a straight line in the axial direction and a flange jacketed in the vicinity of its radial limit with elastomeric material.
Figure 2:
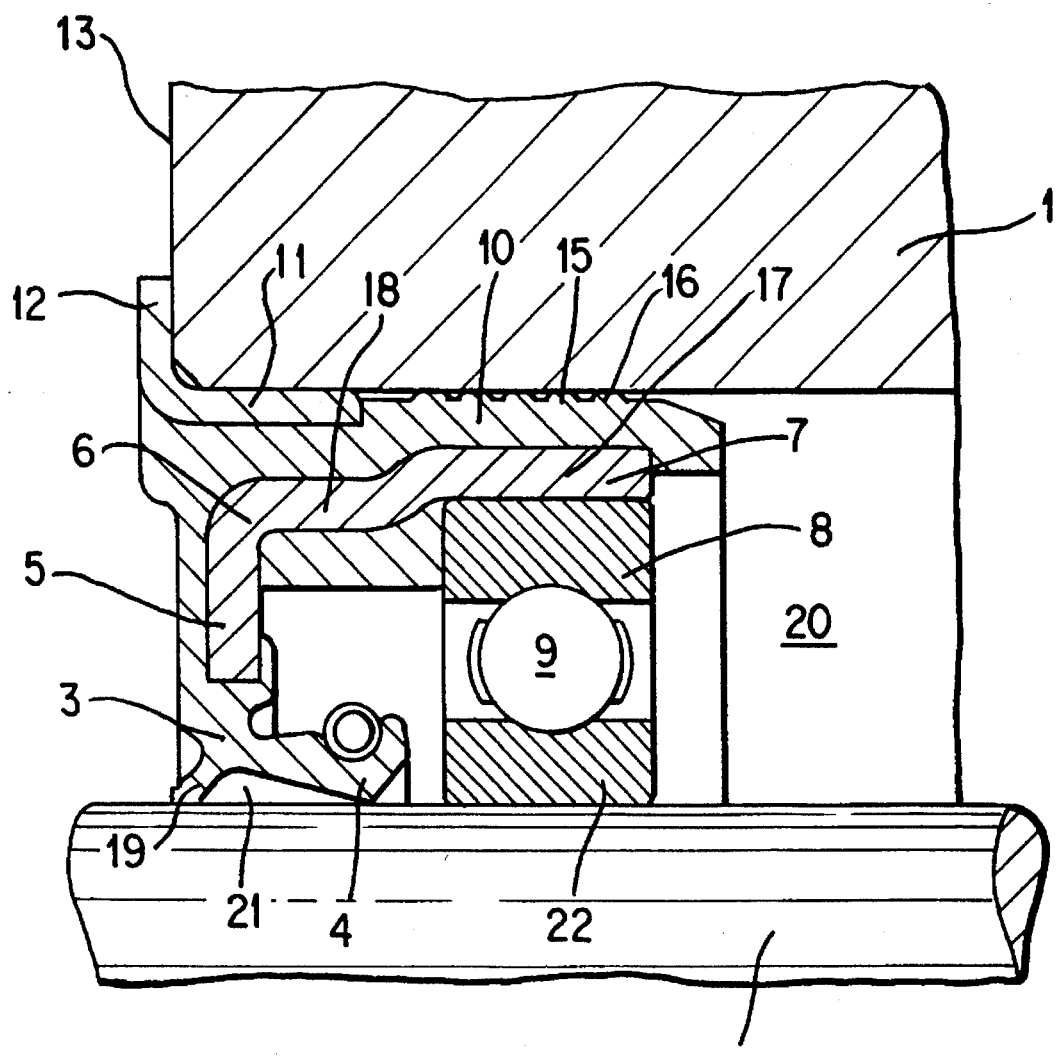
FIG. 2 shows a sectional view of another embodiment of the seal with a leg of a reinforcing ring having a gooseneck shape and the flange having no jacket in the area of its radial limit.
Figure 3:
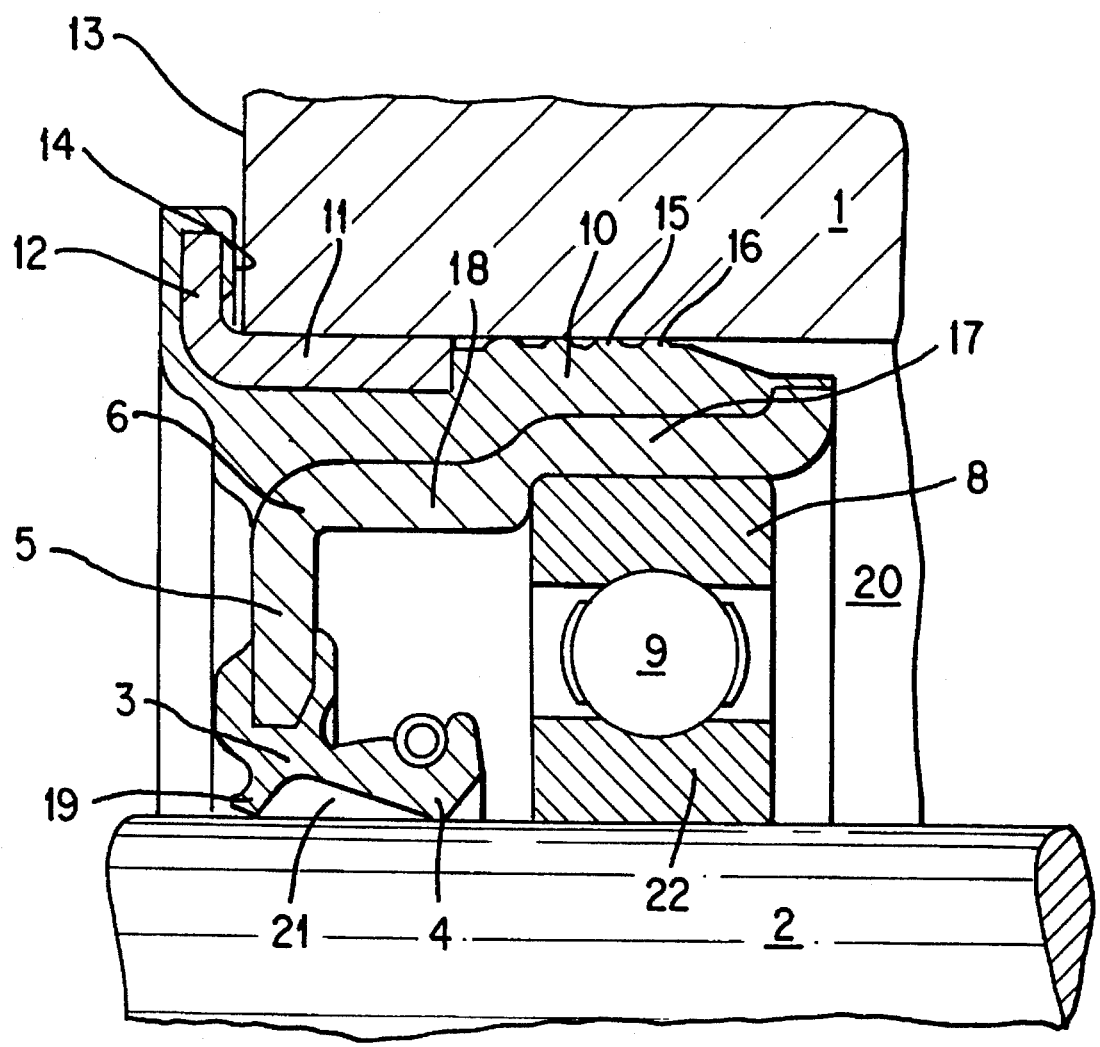
FIG. 3 shows a sectional view of another embodiment of a seal containing features from the embodiments shown in FIGS. 1 and 2. The second leg is made in the shape of a gooseneck, and the flange running in the radial direction is jacketed in the area of its radial limit with elastomeric material.

FIGS. 1, 2, and 3 each show an embodiment of a seal for sealing a shaft 2 passing through a housing wall 1. The seal comprises primarily a radial shaft-sealing ring 3 and an integral roller bearing 9. The radial shaft-sealing ring 3 dynamically seals the shaft 2 relative to the housing wall 1. Dynamic sealing of the shaft 2 is provided by a sealing lip 4 and an auxiliary sealing lip 19, which contact the shaft 2 circumferentially. The auxiliary sealing lip 19 is axially spaced from the sealing lip 4, and defines a cavity 21 with respect thereto. The cavity be 21 can be filled with grease to protect the sealing lip 4. A first reinforcing ring 6 has a first leg 5 extending in the radial direction and a second leg 7 extending in the axial direction. The second leg overlaps and abuts the outer ring 8 of the roller bearing 9 in the axial direction. The roller bearing 9 is retained by the inner ring 22 and the outer ring 8.

The jacket 10 is designed to provide equalization of heat-related tolerances. Best results are achieved when the jacket thickness is preferably between 0.7 mm and 3 mm. It has also been found that especially good properties such as vibration isolation and damping, as well as a minimization of noise transmission, can be achieved when the jacket thickness is preferably in the range from 0.9 mm to 2 mm.

The seal also provides vibration isolation and damping as well as noise reduction during operation. A second reinforcing ring 11 provides reliable spatial mounting of the seal and, in the vicinity of its outer circumference, abuts the limiting wall of the hole inside the housing wall 1 under radial pretensioning. The sealing action in this area is provided by the jacket 10 projecting beyond the second reinforcing ring in the radial direction.

In FIG. 1, the second leg 7 of the first reinforcing ring 6 extends in the axial direction, with the second reinforcing ring 11 extending essentially for the same amount in the axial direction as the second leg 7. Near the axial limit 23 of the second leg 7, the jacket 10 projects slightly beyond the second reinforcing ring 11, so that a reliable sealing of the medium is ensured during proper use. In addition, a flange 12, projecting outward in the radial direction, has a jacket of elastomeric material in the vicinity of its radial limit. This jacket is integral with the jacket 10 in this embodiment. The second reinforcing ring 11 provides a reliable frictional mounting of the seal within the gap delimited by the shaft 2 and the housing wall 1.

Additional sealing is provided by the axial sealing lip 14 which seals off the flange 12 (which projects in the radial direction) from the radial surface 13.

In the embodiment of FIG. 2, the second leg 7 has a gooseneck profile. A first partial portion 17 denotes the area of the second leg 7 whose cylindrical diameter is relatively large. The first partial portion 17 overlaps the roller bearing 9 in the axial direction. A second partial portion 18 denotes the area of the second leg 7 whose cylindrical diameter is relatively small. The jacket 10 is radially interposed between the second reinforcing ring 11 and the first reinforcing ring 6. Importantly, the layer thickness of the jacket 10 must be essentially constant to avoid the undesired accumulation of material. This is especially favorable from the manufacturing engineering standpoint.

The frictional connection for mounting the seal inside the housing wall 1 is also provided in this embodiment by the second reinforcing ring 11. In the embodiment of FIG. 2, the second reinforcing ring 11 is made shorter in the axial direction than its embodiment in FIG. 1. In FIG. 2 also, the jacket 10 projects outward beyond the second reinforcing ring 11 in the radial direction so that reliable sealing of the medium is ensured. The flange 12, made integral with the second reinforcing ring 11, serves to exactly position the seal inside the housing wall 1. A static seal in the vicinity of the housing wall 1 is provided by the sealing ribs 15, 16.

The embodiment of the seal according to FIG. 3 combines the advantageous design features of the embodiments shown in FIGS. 1 and 2. In the vicinity of the flange 12, projecting radially outward, a jacket 10 of elastomeric material is provided. The jacket 10 may engage the radial surface 13 of the housing wall 1 by the axial sealing lip 14 in sealing fashion. The gooseneck profile of the second leg 7 provides that the seal have comparatively small dimensions in the radial direction. Also in this embodiment, the second reinforcing ring 11 holds the seal inside the housing wall 1 by friction.

What is claimed is:

1. A seal for a shaft in a housing, comprising:

a radial shaft-sealing ring circumferentially surrounding the shaft;

a sealing lip which seals against the surface of the shaft, said sealing lip being integral with and concentrically abutting said radial shaft-sealing ring, said sealing lip formed of an elastomeric material under radial pretensioning;

an L-shaped first reinforcing ring concentric with and radially exterior to said radial shaft-sealing ring, said first reinforcing ring including a first leg pointing radially inward toward the shaft and a second leg pointing in a direction parallel to the shaft, such that said radial shaft-sealing ring is attached to said first leg;

an outer ring abutting a partial extent of said second leg, said outer ring concentric with and interior to said second leg;

an inner ring, said inner ring concentric with and abutting the shaft;

a roller bearing located between said inner ring and said outer ring;

a jacket formed of an elastomeric material, said jacket exterior, partially overlapping, and concentric with said second leg; and a second reinforcing ring comprising a flange that both points radially away from the shaft and that abuts a radial side of the housing, said second reinforcing ring partially overlapping and being concentric with said jacket such that said second reinforcing ring abuts the housing; and wherein said jacket extends beyond said second reinforcing ring in the direction parallel to the shaft.

2. The seal of claim 1, wherein said second reinforcing ring and said jacket are adhesively joined.

3. The seal of claim 2, wherein said second leg further comprises a first partial portion and a second partial portion, wherein the diameter of said first partial portion is greater than the diameter of said second partial portion and said first partial portion partially and concentrically surrounds said outer ring.

4. The seal of claim 2, further comprising a sealing rib integral with said jacket such that said sealing rib contacts the housing in the portion of the housing not contacted by said second reinforcing ring.

5. The seal of claim 2, further comprising:

an elastomer extension integral with said jacket and partially covering said flange; and an axial sealing lip integral with said elastomer extension, said axial sealing lip projecting in a direction parallel to said shaft towards the housing.

6. The seal of claim 5, further comprising a sealing rib integral with said jacket such that said sealing rib contacts the housing in the portion of the housing not contacted by said second reinforcing ring.

7. The seal of claim 1, further comprising:

an elastomer extension integral with said jacket and partially covering said flange; and an axial sealing lip integral with said elastomer extension, said axial sealing lip projecting in a direction parallel to said shaft towards the housing.

8. The seal of claim 1, wherein said jacket has a thickness in the range 0.7 mm to 3 mm.

9. The seal of claim 8, further comprising a sealing rib integral with said jacket, wherein the sealing rib contacts the housing in the portion of the housing not contacted by said second reinforcing ring.

10. The seal of claim 8, wherein said second leg further comprises a first partial portion and a second partial portion, wherein the diameter of said first partial portion is greater than the diameter of said second partial portion, and said first partial portion partially and concentrically surrounds said outer ring.

11. The seal of claim 10, further comprising a sealing rib integral with said jacket, wherein the sealing rib contacts the housing in the portion of the housing not contacted by said second reinforcing ring.

12. The seal of claim 1, further comprising a sealing rib integral with said jacket such that said sealing rib contacts the housing in the portion of the housing not contacted by said second reinforcing ring.

13. A seal for a shaft in a housing, comprising:

a radial shaft-sealing ring circumferentially surrounding the shaft;

a sealing lip that is integral with and concentrically abuts said radial shaft-sealing ring, said sealing lip formed of an elastomeric material under radial pretensioning;

an L-shaped first reinforcing ring concentric with and radially exterior to said radial shaft-sealing ring, said first reinforcing ring including a first leg pointing radially inward toward the shaft and a second leg pointing in a direction parallel to the shaft, said second leg further comprising a first partial portion and a second partial portion, wherein the diameter of said first partial portion is greater than the diameter of said second partial portion and said first partial portion partially and concentrically surrounds said outer ring.

wherein said radial shaft-sealing ring is attached to said first leg;

an outer ring abutting a partial extent of said second leg, said outer ring concentric with and interior to said second leg;

an inner ring, said inner ring concentric with and abutting the shaft;

a roller bearing located between said inner ring and said outer ring;

a jacket formed of an elastomeric material, said jacket exterior, partially overlapping, and concentric with said second leg; and a second reinforcing ring comprising a flange that points radially away from the shaft and that abuts a radial side of the housing, said second reinforcing ring partially overlapping and concentric with said jacket, such that said second reinforcing ring abuts the housing; and wherein said jacket extends beyond said second reinforcing ring in the direction parallel to the shaft.

* * * * *